US008855645B2

(12) United States Patent
Bienas et al.

(10) Patent No.: US 8,855,645 B2
(45) Date of Patent: Oct. 7, 2014

(54) RADIO COMMUNICATION DEVICES AND CELLULAR WIDE AREA RADIO BASE STATION

(71) Applicants: Intel Mobile Communications GmbH, Neubiberg (DE); Intel Corporation, Santa Clara, CA (US)

(72) Inventors: Maik Bienas, Brauschweig (DE); Youn Hyoung Heo, Hawsung (KR); Umesh Phuyal, Hillsboro, OR (US); Pingping Zong, Randolph, NJ (US)

(73) Assignees: Intel Mobile Communications GmbH, Neubiberg (DE); Intel Corporation, Santa Clara, CA (US)

( * ) Notice: Subject to any disclaimer, the term of this patent is extended or adjusted under 35 U.S.C. 154(b) by 0 days.

(21) Appl. No.: 13/779,884

(22) Filed: Feb. 28, 2013

(65) Prior Publication Data

US 2014/0243040 A1    Aug. 28, 2014

(51) Int. Cl.
  H04W 36/00    (2009.01)
  H04W 88/06    (2009.01)
  H04M 1/00     (2006.01)

(52) U.S. Cl.
  CPC .................................... *H04W 88/06* (2013.01)
  USPC ...................................... 455/436; 455/426.1

(58) Field of Classification Search
  CPC .... H04W 36/18; H04W 36/30; H04W 76/023
  USPC ................... 455/426.1, 436, 552.1
  See application file for complete search history.

(56) References Cited

U.S. PATENT DOCUMENTS

| | | | |
|---|---|---|---|
| 2010/0009675 A1* | 1/2010 | Wijting et al. | 455/426.1 |
| 2010/0279672 A1  | 11/2010 | Koskela et al. | |
| 2013/0184024 A1* | 7/2013 | Chen et al. | 455/509 |
| 2013/0308598 A1* | 11/2013 | Madan et al. | 370/331 |

FOREIGN PATENT DOCUMENTS

WO    2011147462 A1    12/2011

OTHER PUBLICATIONS

3GPP TS 36.300 V10.7.0 (Mar. 2012); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2; (Release 10); pp. 1-194.
3GPP TS 36.331 V10.5.0 (Mar. 2012); 3rd Generation Partnership Project; Technical Specification Group Radio Access Network; Evolved Universal Terrestrial Radio Access (E-UTRA); Radio Resource Control (RRC); Protocol specification; (Release 10); pp. 1-302.

(Continued)

*Primary Examiner* — Lee Nguyen
(74) *Attorney, Agent, or Firm* — Schwabe, Williamson & Wyatt, P.C.

(57) ABSTRACT

A radio communication device may include a cellular wide area radio communication technology circuit configured to provide a communication according to a cellular wide area radio communication technology; a circuit configured to provide a direct communication device to communication device communication; and a message generator configured to generate a message indicating a request for a handover from an established direct communication device to communication device communication connection with a second radio communication device to a cellular wide area radio communication connection with the second radio communication device.

16 Claims, 6 Drawing Sheets

(56) References Cited

OTHER PUBLICATIONS

3GPP TS 36.101 V10.6.0 (Mar. 2012); 3rd Generation Partnership Project; Technical Specification Group Radio Access Network; Evolved Universal Terrestrial Radio Access (E-UTRA); User Equipment (UE) radio transmission and reception (Release 10); pp. 1-312.

3GPP TR 22.803 V0.3.0 (May 2012) 3rd Generation Partnership Project; Technical Specification Group SA; Feasibility Study for Proximity Services (ProSe) (Release 12); pp. 1-24.

3GPP TS 36.306 V10.1.0 (Mar. 2011); 3rd Generation Partnership Project; Technical Specification Group Radio Access Network; Evolved Universal Terrestrial Radio Access (E-UTRA); User Equipment (UE) radio access capabilities; (Release 10); pp. 1-18.

3GPP TS 36.304 V10.5.0 (Mar. 2012); 3rd Generation Partnership Project; Technical Specification Group Radio Access Network; Evolved Universal Terrestrial Radio Access (E-UTRA); User Equipment (UE) procedures in idle mode (Release 10); pp. 1-33.

3GPP TS 36.321 V10.5.0 (Mar. 2012); 3rd Generation Partnership Project; Technical Specification Group Radio Access Network; Evolved Universal Terrestrial Radio Access (E-UTRA); Medium Access Control (MAC) protocol specification (Release 10); pp. 1-54.

3GPP TR 22.803 V1.0.0 (Aug. 2012) 3rd Generation Partnership Project; Technical Specification Group SA; Feasibility Study for Proximity Services (ProSe) (Release 12); pp. 1-33.

3GPP TS 36.306 V9.2.0 (Jun. 2010); 3rd Generation Partnership Project; Technical Specification Group Radio Access Network; Evolved Universal Terrestrial Radio Access (E-UTRA); User Equipment (UE) radio access capabilities (Release 9); pp. 1-16.

European Patent Office; International Search Report and Written Opinion for PCT/EP2014/051020; Jul. 30, 2014; 8 pages.

* cited by examiner

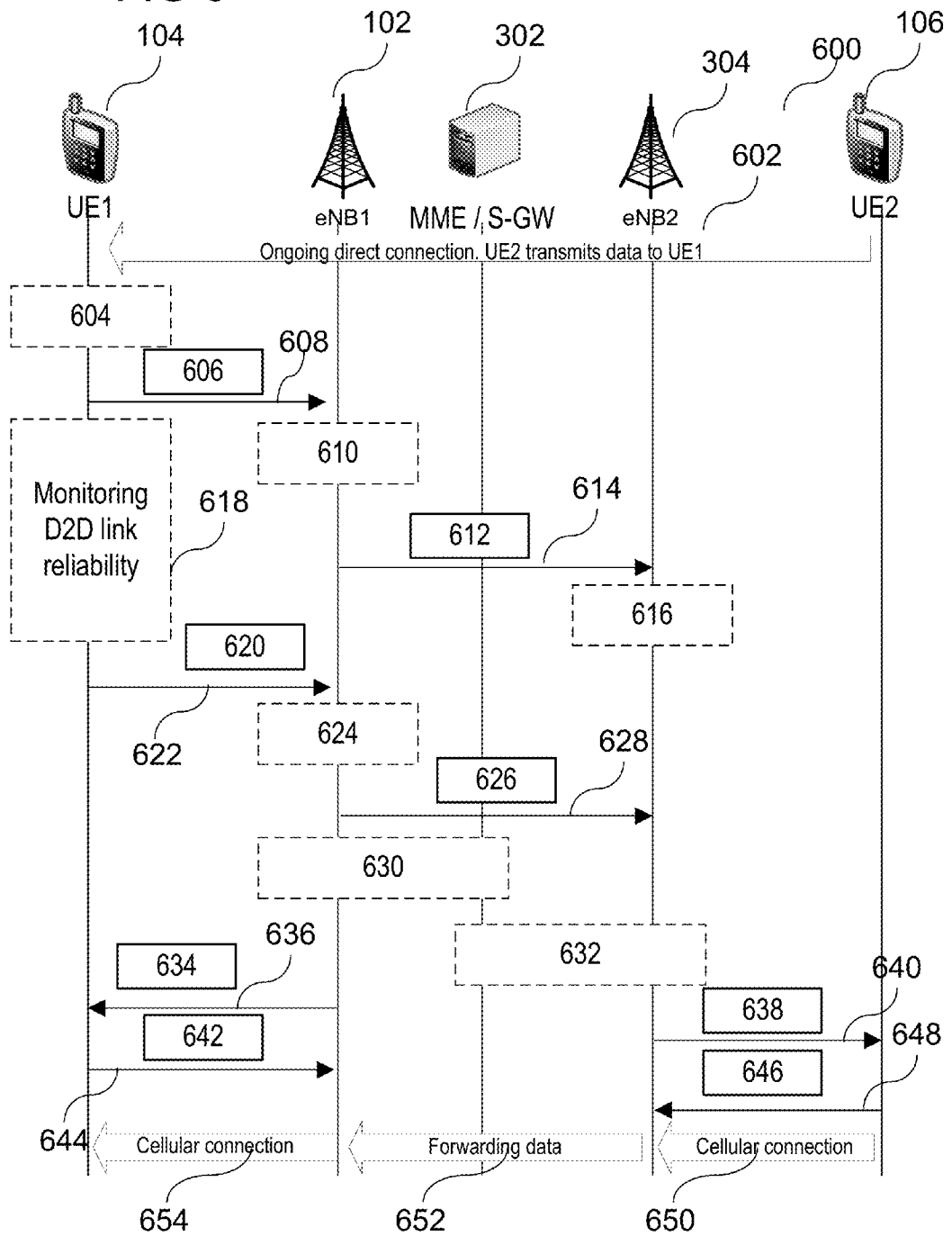

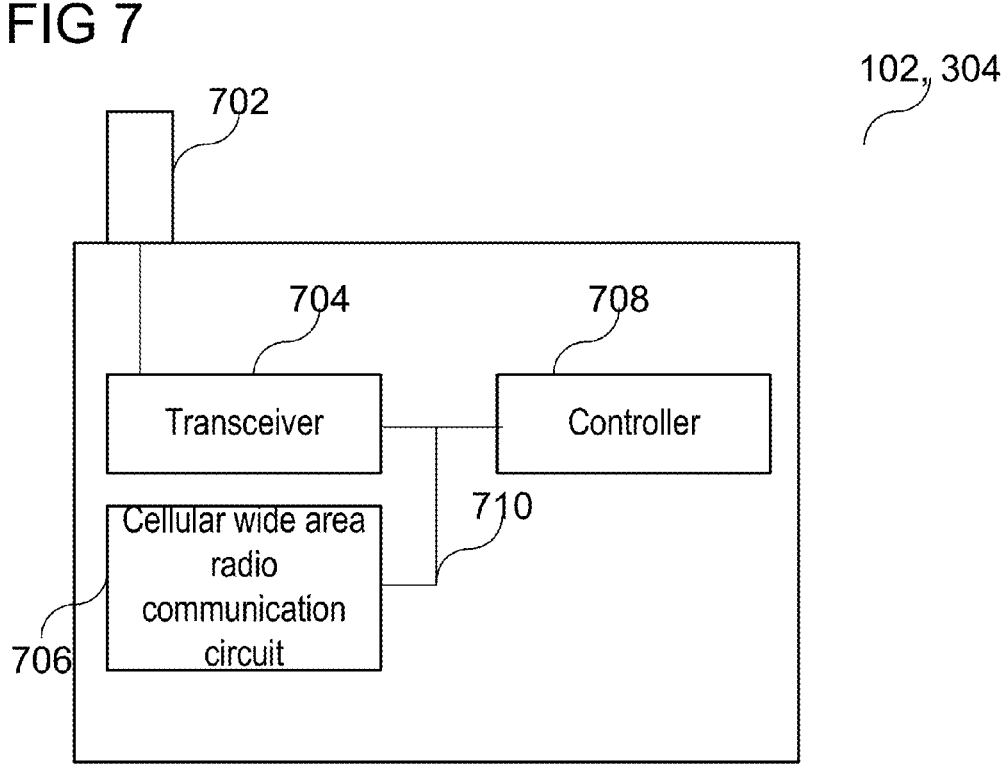

RADIO COMMUNICATION DEVICES AND CELLULAR WIDE AREA RADIO BASE STATION

TECHNICAL FIELD

Various aspects of this disclosure relate generally to radio communication devices and to a cellular wide area radio base station.

BACKGROUND

3GPP (Third Generation Partnership Project) is currently in a process of studying use cases and identifying potential requirements for operator controlled discovery of and direct communication between mobile devices that are in close proximity. This activity is commonly known as "ProSe" (Proximity Services). It is expected that the corresponding technical stage 2 work on this topic starts soon when work on 3GPP Rel-12 begins. Possible use cases for direct UE-to-UE communication are for example: commercial use, social use, network offloading, UEs acting as mobile relays (e.g., for purposes such as coverage extension, mitigation of access technology mismatch, and alike), public safety, etc.

The "ProSe" topic can be divided into two parts:
Proximity Detection (this may be infrastructure assisted): This procedure determines whether given proximity criteria are fulfilled ("e.g. a UE (User Equipment) is in proximity of another UE"). The aim is twofold: to discover the proximity of two or more UEs in general and to clarify whether a direct UE-to-UE communication is possible. Criteria can be different for discovery and UE-to-UE communication.
UE-to-UE Communication (this may be under continuous control of the Mobile Network Operator (MNO)).

Direct UE-to-UE Communication is also referred to as "Device-to-Device Communication" or "D2D Communication". There are in principle two alternatives to realize such a direct communication path between mobile devices: the D2D air interface (called Ud in this description) could be realized by some type of short range technology in frequency bands different from the frequency bands used by the cellular network, such as e.g. Bluetooth or WiFi, or by re-using the LTE technology, which may be using the same frequency bands for the D2D communication as used by the cellular network.

The mobility of D2D devices that are using direct communication links as described above is limited to the coverage area of the direct communication link. This is typically some 100 meters. If the distance of the devices will exceed the coverage area due to the devices' mobility, the D2D connection will break.

SUMMARY

A radio communication device may include a cellular wide area radio communication technology circuit configured to provide a communication according to a cellular wide area radio communication technology; a circuit configured to provide a direct communication device to communication device communication; and a message generator configured to generate a message indicating a request for a handover from an established direct communication device to communication device communication connection with a second radio communication device to a cellular wide area radio communication connection with the second radio communication device.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 6 shows a second message flow diagram illustrating a handover process;
and
FIG. 7 shows a cellular wide area radio base station.

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

In the following, a "circuit" may be understood as any kind of a logic implementing entity, which may be hardware, software, firmware, or any combination thereof. Thus, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). As will be described in more detail below, a "circuit" may also be software being implemented or executed by a processor, e.g. any kind of computer program, e.g. a computer program using a virtual machine code such as e.g. Java. Any other kind of implementation of the respective functions which will be described in more detail below may also be understood as a "circuit".

The terms "coupling" or "connection" are intended to include a direct "coupling" or direct "connection" as well as an indirect "coupling" or indirect "connection", respectively.

The term "protocol" is intended to include any piece of software, that is provided to implement part of any layer of the communication definition. "Protocol" may include the functionality of one or more of the following layers: physical layer (layer 1), data link layer (layer 2), network layer (layer 3), or any other sub-layer of the mentioned layers or any upper layer.

As will be described in more detail below, seamless handover processes are provided from a direct communication device to communication device communication (D2D) communication connection to a cellular wide area radio communication connection.

Figure 1:
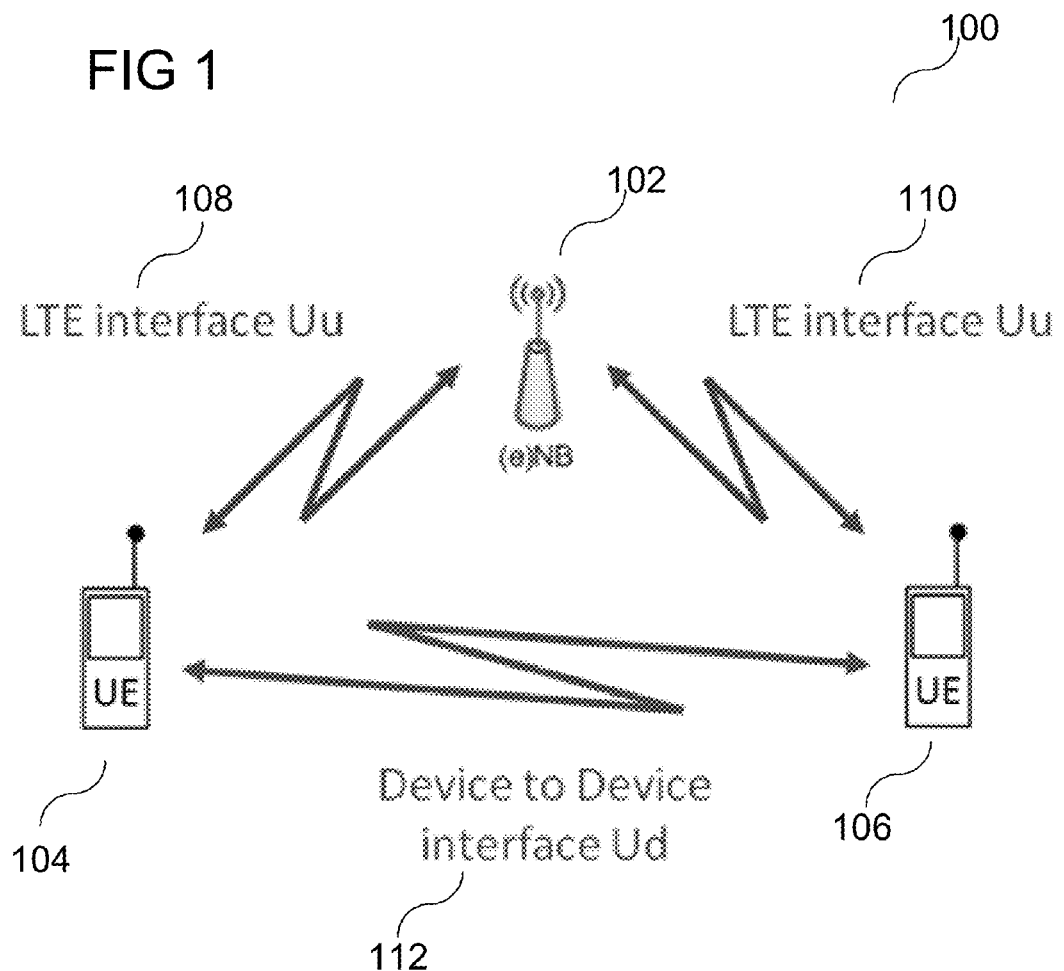
FIG. 1 shows a D2D architecture.

FIG. 1 shows a mobile radio communication system 100 which is configured according to a cellular wide area radio communication technology, such as e.g. a Third Generation Partnership Project (3GPP) communication technology such as e.g. UMTS (Universal Mobile Telecommunications System), LTE (Long Term Evolution), LTE-Advance, and the like. It is to be noted that any other cellular wide area radio communication technology may be provided such as e.g. a Global System for Mobile Communications (GSM) radio communication technology, a General Packet Radio Service (GPRS) radio communication technology, an Enhanced Data Rates for GSM Evolution (EDGE) radio communication technology, FOMA (Freedom of Multimedia Access), CDMA2000 (Code division multiple access 2000), CDPD (Cellular Digital Packet Data), Mobitex, HSCSD (High-Speed Circuit-Switched Data), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), TD-CDMA (Time Division-Code Division Multiple Access), TD-CDMA (Time Division-Synchronous Code Division Multiple Access), cdmaOne (2G), CDMA2000 (3G) (Code division multiple access 2000 (Third generation)).

Figure 2:
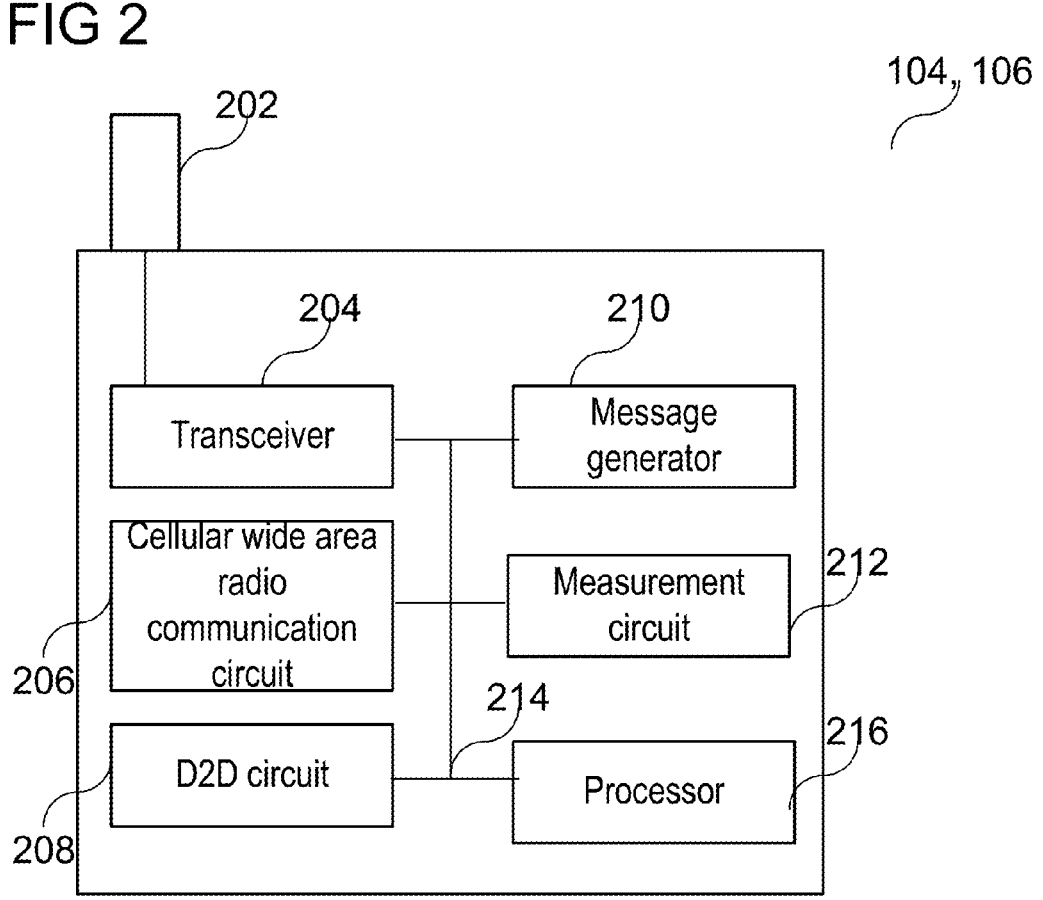
FIG. 2 shows a mobile radio communication terminal device.

The mobile radio communication system 100 may include a core network (not shown in FIG. 1) and an E-UTRAN (Evolved UMTS Terrestrial Radio Access Network) (in general any suitable UTRAN or RAN) including a plurality of base stations, e.g. (e)NodeBs (in the case of LTE or LTE Advanced), wherein one eNodeB 102 is shown in FIG. 1. Furthermore, a first communication terminal device (e.g. a first UE) 104 and a second communication terminal device (e.g. a second UE) 106 are provided. It should be noted that any number of further communication terminal device (e.g. of further UEs) may be provided. According to this implementation, each UE 104, 106 may have a configuration as shown in FIG. 2 and as will be described in more detail below. Each UE 104, 106 may be configured to provide a communication connection according to a cellular wide area radio communication technology such as e.g. according to LTE or LTE Advanced, e.g. via a respective air interface connection (also referred to as LTE interface Uu connection) 108, 110 as well as a communication connection established directly between the first UE 104 and the second UE 106 (also referred to as a direct communication device to communication device communication connection or device-to-device (D2D) communication connection) bypassing the base station(s) 102. For the physical layer D2D communication connection, any radio communication technology may be provided such as LTE with different or similar frequencies as are used for the communication with the base station(s) or any for this purpose newly developed LTE based radio communication technology (LTE direct). Alternatively, a Short Range radio communication technology may be used for the physical layer D2D communication connection such as e.g. a Bluetooth radio communication technology, an Ultra Wide Band (UWB) radio communication technology, and/or a Wireless Local Area Network radio communication technology (e.g. according to an IEEE 802.11 (e.g. IEEE 802.11n) radio communication standard)), IrDA (Infrared Data Association), Z-Wave and ZigBee, HiperLAN/2 ((HIgh PErformance Radio LAN; an alternative ATM-like 5 GHz standardized technology), IEEE 802.11a (5 GHz), IEEE 802.11g (2.4 GHz), IEEE 802.11n, IEEE 802.11VHT (VHT=Very High Throughput). The D2D communication connection may be established via a device to device interface Ud 112.

As shown in FIG. 2, each UE 104, 106 may include one or more antennas 202, a transceiver 204 coupled to the one or more antennas 202, wherein the transceiver 204 may include one or more transmitters and/or one or more receivers. Moreover, each UE 104, 106 may include a cellular wide area radio communication technology circuit 206 configured to provide a communication according to a cellular wide area radio communication technology such as one as described above and a circuit 208 configured to provide a direct communication device to communication device communication such as one as described above. Furthermore, a message generator 210 may be provided configured to generate a message indicating a request for a handover from an established direct communication device to communication device (D2D) communication connection with another radio communication (terminal) device to a cellular wide area radio communication connection with the other radio communication device. Moreover, optionally, each UE 104, 106 may include a measurement circuit 212 configured to measure a signal quality of signals of the established direct communication device to communication device (D2D) communication connection with the other radio communication (terminal) device. The transceiver 204, the cellular wide area radio communication technology circuit 206, the circuit 208, the message generator 210 and the optional measurement circuit 212 may be coupled with each other, e.g. via one or more lines 214, e.g. one or more bus lines 214. Furthermore, a processor 216 may be provided which may also be coupled to the one or more lines 214. The processor 216 may implement some or all of the functions provided in the context of the processes as will be described in more detail below. Furthermore, one or more of the following circuits may also be implemented by the processor 216: the transceiver 204, the cellular wide area radio communication technology circuit 206, the circuit 208, the message generator 210, and/or the optional measurement circuit 212.

The following (not necessary) assumptions are made for the following description:

the air interface between UE 104, 106 and base station 102, 304 (Uu interface 108, 110) uses LTE-FDD (Frequency Division Duplex) or LTE-TDD (Time Division Duplex);

the air interface between two (or more) (e.g. mobile) devices (e.g. UEs 104, 106) for direct UE-to-UE communication (Ud interface 112) uses the same or different frequency bands than the Uu interface 108, 110; and the (e.g. mobile) devices that are engaged in D2D communication (over Ud interface 112) are controlled by the MNO (Mobile radio Network Operator) and therefore require an active RRC (Radio Resource Control) connection to the MNO's infrastructure (over Uu) during certain times, e.g. during connection setup.

Illustratively, the D2D communication is under control of the MNO such as e.g. under the control of the mobile radio communication network implementing the UTRAN and the Core Network of the mobile radio communication system 100.

Figure 3:
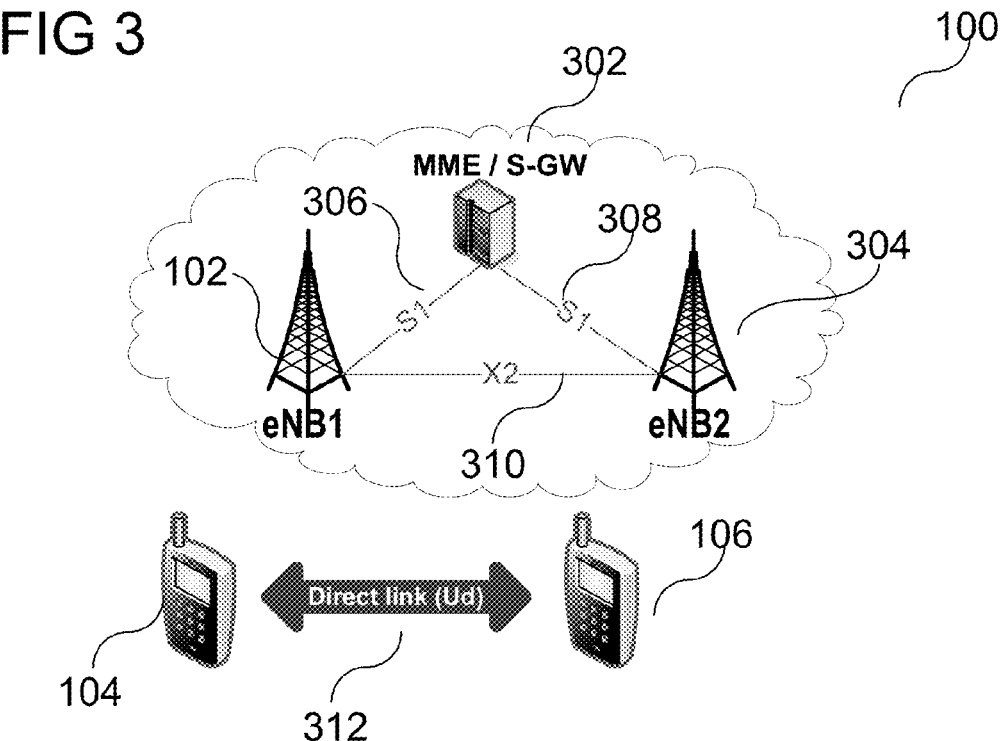
FIG. 3 shows a communication system architecture illustrating a D2D communication connection before a handover to a communication connection via a mobile radio communication network.

FIG. 3 shows the mobile radio communication system 100 of FIG. 1, wherein core network components are shown such as e.g. a Mobility Management Entity (MME) and a Serving Gateway (S-GW) 302. Furthermore, a further base station 304, e.g. a further (e)NodeB 304 (in the case of LTE or LTE Advanced) may be provided. The MME and S-GW 302 may be coupled with the (e)NodeB 102 via a first S1 interface 306 and with the further (e)NodeB 304 via a second S1 interface 308. Moreover, the (e)NodeB 102 and the further (e)NodeB 304 may be coupled with each other via an X2 interface 310. As shown in FIG. 3, the first UE 104 and the second UE 106 have an established D2D communication connection 312 bypassing the UTRAN and the Core Network, in other words, bypassing the base stations 102, 304. The core network may include further components such as e.g. one or more Application Servers and/or an IMS (Internet Protocol (IP) Multimedia Subsystem) and the like, which are not shown in the figures for reasons of simplicity.

As will be described in more detail below, various aspects of this disclosure may avoid the loss of a communication connection initiated as a D2D communication connection in case of departing D2D communication (e.g. terminal) devices. One aspect may be seen in that cellular network elements will take over the communication session prior to the direct communication link or communication connection being lost. The scenario is depicted in FIG. 4.

Figure 4:
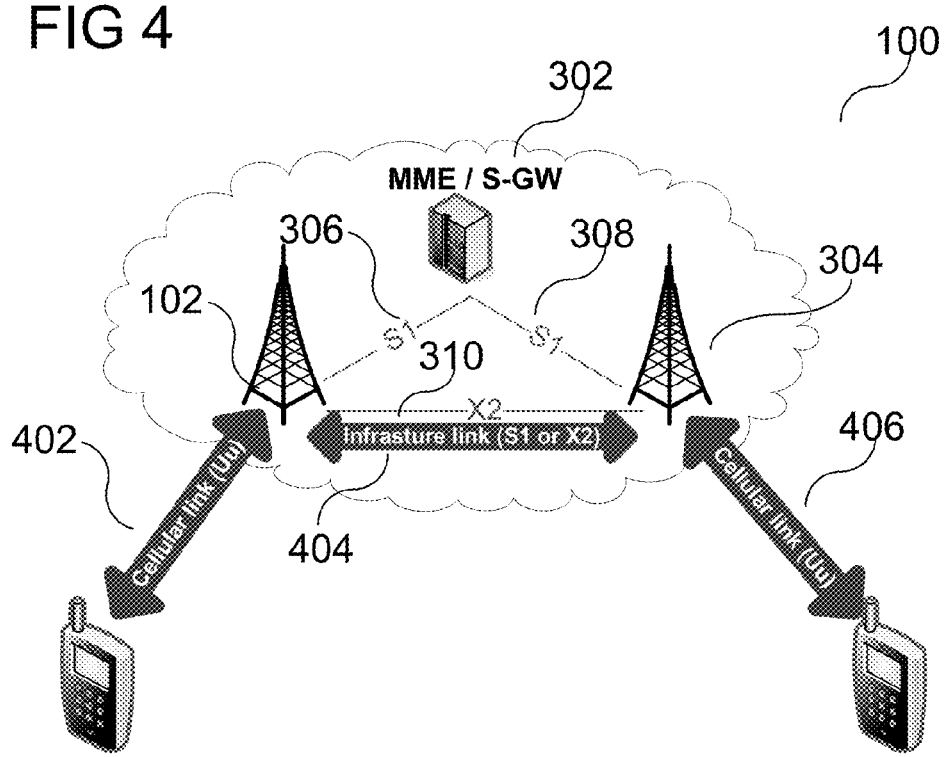
FIG. 4 shows a communication system architecture illustrating a D2D communication connection after the handover to the communication connection via the mobile radio communication network.

FIG. 4 shows the mobile radio communication system 100 of FIG. 1, wherein the core network components and the E-UTRAN components have transferred the communication connection from a D2D communication connection to a communication connection being established via the base stations 102, 304 under the control of the network. In more detail, the base station 102 which controls the D2D communication connection 312, initiates a handover process (which will be described in more detail below) with the result that a mobile radio cellular wide area communication connection is established after the handover without a loss or interruption of the D2D communication connection between the first UE 104 and the second UE 106, in other words, a seamless handover may be provided. After the handover, the "new" communication connection may include a plurality of partial communication connections which together form one common communication connection or communication session, e.g. a first partial communication connection 402 between the first UE 104 and the base station 104, e.g via the first air interface connection (also referred to as LTE interface Uu connection) 108, a second partial communication connection 404 between the base station 102 and the further base station 304, e.g. via the X2 interface 310, and a third partial communication connection 406 between the further base station 304 and the second UE 106, e.g via the second air interface connection (also referred to as LTE interface Uu connection) 110.

Figure 5:
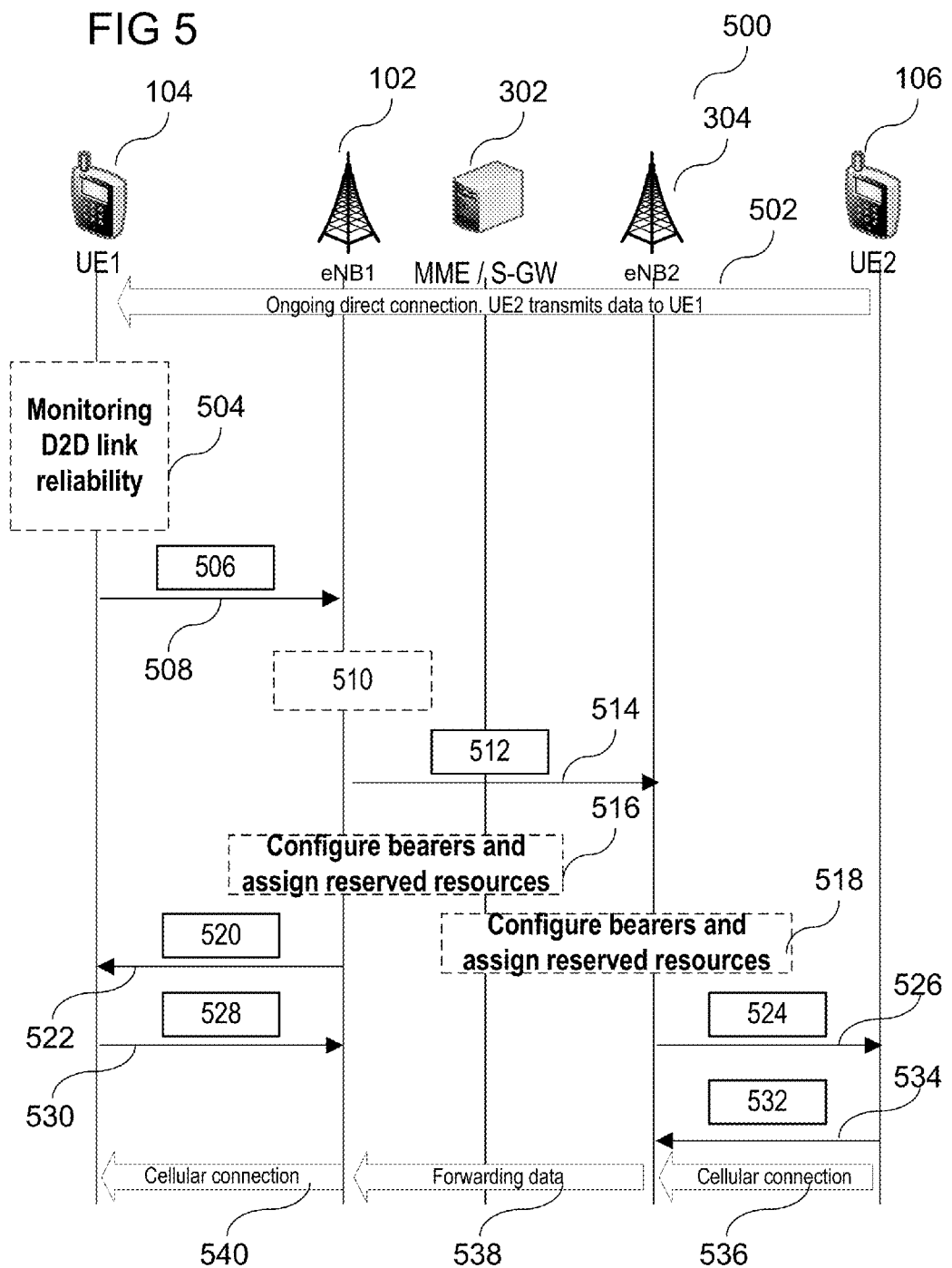
FIG. 5 shows a first message flow diagram illustrating a handover process.

In the following, various processes of the handover will be described in more detail with reference to a first message flow diagram 500 in FIG. 5. Various processes are as follows:

As shown in FIG. 5, the process starts with an established D2D communication connection 502 or communication session 502 (e.g. 312 as shown in FIG. 3) between the first UE 104 and the second UE 106. In other words, there is an ongoing direct communication connection (D2D communication connection) between the first UE 104 and the second UE 106 and the second UE 106 transmits data to the first UE 104.

As shown in FIG. 5, in 504, the first UE 104 monitors the D2D communication connection 502 reliability, e.g. by (periodically) measuring the current D2D communication connection 502 reliability, e.g. by means of the measurement circuit 212. In general, all UEs 104, 106 involved in a direct (D2D) communication may periodically measure the current communication connection 502 reliability and may send the result to the network if one or more certain predefined conditions are met, i.e. e.g. in case that the communication connection 502 reliability is too low. By way of example, the message generator 210 may generate a message 506 indicating a request for a handover from an established direct communication device to communication device (D2D) communication connection with the second UE 106 to a cellular wide area radio communication connection with the second UE 106. The generated message may then be transmitted in 508 by the transmitter of the transceiver 204 to the base station 102, e.g. via the first LTE Uu interface.

To summarize, the first UE 104 and the second UE 104 have an ongoing direct D2D communication between each other. The second UE 104 may currently transmit data to the first UE 104. It may further be assumed, that the controlling eNodeBs (e.g. the eNodeB 102) are aware of the quality of service (QoS) requirements of the ongoing direct communication, because they may have been negotiated between the UEs 104, 106 and the eNodeBs at communication connection setup (to be more precise: QoS requirements may be negotiated during radio bearer setup based on the requested service type). The first UE 104 may be controlled by the base station (e.g. eNodeB 102) and the second UE 106 may be controlled by the further base station 304 (e.g. the further eNodeB 304). At connection setup or during preceding proximity detection, the UEs 104, 106 may exchange the IDs (identifications) of the current serving cell(s). An update may be transmitted in case the serving cell(s) change(s). A list of IDs of the serving cell(s) may be transmitted to all relating base stations (e.g. eNodeBs) during communication session setup.

The measuring by means of the measurement circuit 212 may be carried out by:

measuring the power level of the received reference symbols (P_ref) transmitted by second UE 106; and deriving an indication of the relative speed of the UEs 104, 106 towards each other, e.g. by calculating the difference of two successive P_ref measurements (P_ref_delta));

measuring the power level of the received signal reference symbols (RSRP) transmitted by the base station 102 (e.g. eNodeB 102) and comparing it with P_ref (i.e. comparing Uu link (e.g. 108) and Ud link (e.g. 112)).

After reception of such measurement about low link reliability (e.g. via the message 506), the base station 102 (e.g. eNodeB 102) may prepare for session transfer and may carry out a communication session transfer (in other words communication session or connection handover), e.g. in 510, i.e. select configurations for Signalling Radio Bearers (SRBs) and Data Radio Bearers (DRBs) and relating Transport Channels, Logical Channels and Physical Channels and reserve radio resources for the required Physical Channels. The preparation is done based on the quality of service (QoS) need of the current direct communication. The required QoS may be already known by the base station 102 or the core network (e.g. the MME/S-GW 302) or may be transmitted from the first UE 104 to the base station 102 using a specific message field of the message 506 or in a further message (not shown in FIG. 5).

The base station 102, e.g. the eNodeB 102, may thus derive information about the required resources and the involved UEs 104, 106 during set up of the direct communication or the information is provided by the first UE 104 as part of measurement results. The base station 102, e.g. the eNodeB 102, may take into account the already assigned resources used by the UEs 104, 106 prior to the communication session or communication connection transfer, e.g. configured SRBs (Signalling Radio Bearers) to control the direct D2D communication connection and the relating communication channels (e.g. PDCCH (Physical Downlink Communication Control Channel) and PUCCH (Physical Uplink Communication Control Channel)) and may re-use the assignment after the communication session transfer. This preparation may take place for all UEs 104, 106 that are associated to the affected D2D communication.

Furthermore, the base station 102 (e.g. the eNodeB 102) may be aware that the further base station 304 (e.g. eNodeB 304) may control the second UE 106 due to previously received information, as described above. Therefore, it requests the further base station 304 (e.g. the further eNodeB 304) to prepare and carry out the communication session transfer from the second UE 106 using a D2D communication session transfer request message 512, which the base station 304 (e.g. the further eNodeB 304) generates and transmits the same, in 514, to the further base station 304 (e.g. further eNodeB 304).

Furthermore, the base station 102 (e.g. the eNodeB 102) may request the MME/S-GW 302 to setup an E-UTRAN Radio Access Bearer (E-RAB) for UE1 required for the Uu interface or to modify the bearer that is used over Ud interface to the needs required for the Uu interface, e.g. in 516. The MME/S-GW 302 will perform the requested setup or modification. The bearer required after D2D communication session transfer (in other words handover) is terminated at the base station 102 (e.g. eNodeB 102). In this case the setup or modification of such new bearer may be handled in the base station 102 (e.g. eNodeB 102) and not in the MME/S-GW 302. The request message to the MME/S-GW 302 is therefore not required in this case.

The further base station 304 (e.g. the further eNodeB 304) may request the MME/S-GW 302 to setup an E-UTRAN Radio Access Bearer (E-RAB) for the second UE 106, e.g. in 518, provided for the Uu interface or to modify the bearer that is used over Ud interface to the needs required for the Uu interface. The MME/S-GW 302 may perform the requested setup or modification. The bearer required after the D2D communication session transfer may be terminated at the base station 102 (e.g. the eNodeB 304). In this case the setup or modification of such new bearer may be handled either in the base station 102 (e.g. the eNodeB 102) or in the further base station 304 (e.g. the further eNodeB 304) and not in the MME/S-GW 302. The request message to the MME/S-GW may therefore not be required in this case.

Moreover, the base station 102 (e.g. the eNodeB 102) may assign the reserved resources to the first UE 104 by generation and transmission of an RRC connection setup message 520 to the first UE 104, e.g. in 522.

In a similar manner, the further base station 304 (e.g. the further eNodeB 304) may assign the reserved resources to the second UE 106 by generation and transmission of a further RRC connection setup message 524 to the second UE 106, e.g. in 526.

Furthermore, the first UE 102 may confirm the reception of the RRC connection setup message 520 by generation and transmission of an RRC connection setup complete message 528 to the base station 102 (e.g. the eNodeB 102), e.g. in 530.

Moreover, the second UE 106 may confirm the reception of the further RRC connection setup message 524 by generation and transmission of a further RRC connection setup complete message 532 to the further base station 304 (e.g. the further eNodeB 304), e.g. in 534.

Then, the second UE 106 may transmit user data for the first UE 104 by using the assigned UL (Uplink) resources and may receive control signals for the UL resource on the assigned DL (Downlink) resource (designated with 536 in FIG. 5). The further base station 304 (e.g. the further eNodeB 304) may forward the data to the base station 102 (e.g. the eNodeB 102) (designated with 538 in FIG. 5) and may transmit the data by using the configured DL resources to the first UE 104 (designated with 540 in FIG. 5). The first UE 104 may receive the data on assigned DL resources from the base station 102 (e.g. the eNodeB 102) and may transmit control data for the DL resource on the assigned UL resource.

In the following, various processes of the handover will be described in more detail with reference to a second message flow diagram 600 in FIG. 6. Various processes are as follows:

As shown in FIG. 6, the process starts with an established D2D communication connection 602 (e.g. 312 as shown in FIG. 3) between the first UE 104 and the second UE 106. In other words, there is an ongoing direct communication connection (D2D communication connection) between the first UE 104 and the second UE 106 and the second UE 106 transmits data to the first UE 104.

As shown in FIG. 6, in 604, the first UE 104 monitors the D2D communication connection 602 reliability, e.g. by (periodically) measure the current D2D communication connection 602 reliability, e.g. by means of the measurement circuit 212. In general, all UEs 104, 106 involved in a direct (D2D) communication may periodically measure the current communication connection 602 reliability and may send the result to the network if one or more certain predefined conditions are met, i.e. e.g. in case that tha the communication connection 602 reliability is too low. By way of example, the message generator 210 may generate a first message 606 indicating a possible handover from an established direct communication device to communication device (D2D) communication with the second UE 106 to a cellular wide area radio communication connection with the second UE 106.

The generated first message 606 may then be transmitted in 608 by the transmitter of the transceiver 204 to the base station 102, e.g. via the first LTE Uu interface.

To summarize the first UE 104 and the second UE 104 have an ongoing direct D2D communication 602 between each other. The second UE 104 may currently transmit data to the first UE 104. It may further be assumed, that the controlling eNodeBs (e.g. the eNodeB 102) are aware of the quality of service (QoS) requirements of the ongoing direct communication, because they may have been negotiated between the UEs 104, 106 and the eNodeBs at communication connection setup (to be more precise: QoS requirements may be negotiated during radio bearer setup based on the requested service type). The first UE 104 may be controlled by the base station (e.g. eNodeB 102) and the second UE 106 may be controlled by the further base station 304 (e.g. the further eNodeB 304). At connection setup or during preceding proximity detection, the UEs 104, 106 exchanging the IDs (identifications) of the current serving cell. An update may be transmitted in case the serving cell changes. A list of IDs of the serving cells may be transmitted to all relating base stations (e.g. eNodeBs) during communication session setup.

The measuring by means of the measurement circuit 212 may be carried out by:
  measuring the power level of the received reference symbols (P_ref) transmitted by second UE 106; and
  deriving an indication of the relative speed of the UEs 104, 106 towards each other, e.g. by calculating the difference of two successive P_ref measurements (P_ref_delta));
  measuring the power level of the received reference symbols (RSRP) transmitted by the base station 102 (e.g. eNodeB 102) and comparing it with P_ref (i.e. comparing Uu link (e.g. 108) and Ud link (e.g. 112)).

In case the measured values exceeds a certain predefined first threshold, e.g. the measured P_ref value falls below a predefined first threshold or the P_ref_delta value is above another predefined first threshold (which may indicate that the UEs are departing each other and the direct link will become worse) and/or RSRP (Reference Signal Received Power) is better than a predefined first offset than P_ref, the first UE 104 may transmit an indication of the unreliable link (e.g. a measurement report with the latest measurement results) to the currently controlling base station 102 (e.g. eNodeB 102), e.g. by means of the first message 606. This first message 606 may include a list of UEs participating in the current communication and the relating serving base stations (e.g. serving eNodeBs). This list may not be required if it was already transmitted previously.

After reception of such measurement about low link reliability (e.g. via the first message 606), the base station 102 (e.g. eNodeB 102) may prepare to take over the first part of the communication session by reserving resources matching the current QoS requirements and the transmission direction. I.e in this example it may prepare required downlink resources for the first UE 104 for user data (e.g. PDSCH (Physical Downlink Shared Channel)) and a relating uplink resource for controlling it (e.g. PUCCH (Physical Uplink Control Channel)).

In other words, after reception of such measurement about low link reliability, the base station 102 (e.g. eNodeB 102) may prepare for communication session transfer (e.g. in 610), i.e. select configurations for Signalling Radio Bearers (SRBs) and Data Radio Bearers (DRBs) and relating Transport Channels, Logical Channels and Physical Channels and may reserve radio resources for the required Physical Channels. The preparation may be done based on the QoS need of the current direct communication. The base station 102 (e.g. eNodeB 102) may derive information about the required resources and the involved UEs 104, 106 during set up of the direct communication or the information is provided by the first UE 104 as part of measurement results. The base station 102 (e.g. eNodeB 102) may take into account the already assigned resources used by the UEs prior the session transfer, e.g. configured SRBs to control the direct communication and the relating channels (e.g. PDCCH (Physical Downlink Communication Control Channel) and PUCCH (Physical Uplink Communication Control Channel)) and may re-use the assignment after communication session transfer. This preparation takes place for all UEs that are associated to the affected D2D communication.

The base station 102 (e.g. eNodeB 102) is aware that the further base station 304 (e.g. the further eNodeB 304) is controlling the second UE 106 due to previously received information. Therefore, it may request the further base station 304 (e.g. the further eNodeB 304) to prepare the communication session transfer from the second UE 106, e.g. by generating and transmitting a D2D communication session transfer preparation request message 612 (e.g. in 614).

The further base station 304 (e.g. the further eNodeB 304) may, in 616, prepare to take over the second part of the session by reserving resources that match the current QoS requirements and the transmission direction. I.e. in this example it prepares required uplink resources for the second UE 106 for user data (e.g. PUSCH) and a relating downlink resource for controlling it (e.g. PDCCH).

The first UE 104 may keep on periodically determining the reliability of the current direct connection in 618, e.g. by means of the measurement circuit 212 as described above.

In case the measured value(s) exceed(s) a certain predefined second threshold, e.g. in case the measured P_ref value falls below a predefined second threshold or the P_ref_delta is above another predefined second threshold and/or RSRP is better than a predefined second offset than P_ref, the first UE 104 may generate and transmit, in 622, a second message 620 being indicating a request for a handover from an established direct communication device to communication device communication connection with the second UE 106 to a cellular wide area radio communication connection with the second UE 106. By way of example, the second message 620 may include an indication for the need of a communication session transfer (e.g. a further measurement report) to the currently controlling base station 102 (e.g. the eNodeB 102) with the latest measurement results.

The base station 102 (e.g. the eNodeB 102) may request the MME/S-GW 302 to setup an E-UTRAN Radio Access Bearer (E-RAB) for the first UE 104 required for the Uu interface or to modify the bearer that is used over the Ud interface to the needs required for the Uu interface. The MME/S-GW 302 may detect the requested setup or modification in 624 and may perform the same in 630. The bearer required after D2D session transfer may also be terminated at the base station 102 (e.g. the eNodeB 102). In this case the setup or modification of such a new bearer may be handled in the base station 102 (e.g. the eNodeB 102) and not in the MME/S-GW 302. The request message (e.g. the second message 620) to the MME/S-GW 302 may therefore not be required in this case.

Then, the base station 102 (e.g. the eNodeB 102) may request the further base station 304 (e.g. the further eNodeB 304) to overtake the direct communication from the second UE 106 by means of transmission of a session transfer request message 626, e.g. in 628.

The further base station 304 (e.g. the further eNodeB 304), e.g. may request the MME/S-GW 302 to setup an E-UTRAN Radio Access Bearer (E-RAB) for the second UE 106 required for the Uu interface or to modify the bearer that is used over Ud interface to the needs required for the Uu interface. The MME/S-GW 302 may perform the requested setup or modification, e.g. in 632. The bearer required after D2D session transfer may alternatively be terminated at the base station 102 (e.g. the eNodeB 102). In this case the setup or modification of such new bearer may be handled either in the base station 102 (e.g. the eNodeB 102) or in the further base station 304 (e.g. the further eNodeB 304) and not in the MME/S-GW 302. The request message to the MME/S-GW 302 may therefore not be required in this case.

Moreover, the base station 102 (e.g. the eNodeB 102) may assign the reserved resources to the first UE 104 by generation and transmission of an RRC connection setup message 634 to the first UE 104, e.g. in 636.

In a similar manner, the further base station 304 (e.g. the further eNodeB 304) may assign the reserved resources to the second UE 106 by generation and transmission of a further RRC connection setup message 638 to the second UE 106, e.g. in 640.

Furthermore, the first UE 102 may confirm the reception of the RRC connection setup message 634 by generation and transmission of an RRC connection setup complete message 642 to the base station 102 (e.g. the eNodeB 102), e.g. in 644.

Moreover, the second UE 106 may confirm the reception of the further RRC connection setup message 638 by generation and transmission of a further RRC connection setup complete message 646 to the further base station 304 (e.g. the further eNodeB 304), e.g. in 648.

Then, the second UE 106 may transmit user data for the first UE 104 by using the assigned UL (Uplink) resources and may receive control signals for the UL resource on the assigned DL (Downlink) resource (designated with 650 in FIG. 6). The further base station 304 (e.g. the further eNodeB 304) may forward the data to the base station 102 (e.g. the eNodeB 102) (designated with 652 in FIG. 6) and may transmit the data by using the configured DL resources to the first UE 104 (designated with 654 in FIG. 6). The first UE 104 may receive the data on assigned DL resources from the base station 102 (e.g. the eNodeB 102) and may transmit control data for the DL resource on the assigned UL resource.

In order to implement the above described functions and process in the base station 102 and the further base station 304, each of the bases stations 102, 304 may have a structure of a cellular wide area radio base station 102, 304 as shown in FIG. 7. As shown in FIG. 7, the cellular wide area radio base station 102, 304 may include one or more antennas 702 and a transceiver 704, wherein the transceiver may include a transmitter and a receiver configured to receive a message (e.g. 506 or 620) from the first UE 104, wherein the message (e.g. 506 or 620) is indicating a request for a handover from an established direct communication device to communication device communication connection of the first UE 104 with the second UE 106 to a cellular wide area radio communication connection with the second UE 106. Furthermore, it may include a cellular wide area radio communication technology circuit 706 configured to provide a communication according to a cellular wide area radio communication technology. Furthermore, a controller 708 may be provided configured to establish a cellular wide area radio communication connection between the first UE 104 and the second UE 106 based on the message (e.g. 506 or 620).

The transceiver 704, the cellular wide area radio communication technology circuit 706 and the controller 708 may be coupled with each other, e.g. via one or more lines 710, e.g. one or more bus lines 710. The controller 708 may implement some or all of the functions provided in the context of the processes as has been described above. Furthermore, one or more of the following circuits may also be implemented by the controller 708: the transceiver 704 and the cellular wide area radio communication technology circuit 706.

Various aspects of this disclosure may provide for the ability of a D2D device
  to detect a low link reliability of a direct D2D connection; and
  to indicate the low link reliability to the cellular network;
  to detect the need for a session transfer of the direct D2D connection to the cellular network; and
  to indicate the need to the cellular network.

Furthermore, various aspects of this disclosure may provide for the ability of the cellular wide area network (e.g. the base station, e.g. the eNodeB)
  to prepare and configure resources for a communication session transfer after a low link indication was received;
  to detect whether further entities are required for the communication session transfer (e.g. another eNB and a MME/S-GW);
  to request preparation of the communication session transfer at the further required entities; and
  to assign the prepared resources to the UEs associated to the affected D2D communication once the need for a communication session transfer is indicated.

It should be noted that as an alternative, the base station 102 (e.g. the eNodeB 102) and the further base station 304 (e.g. the further eNodeB 304) may be connected directly via the X2 interface or they may be connected via an S1 interface to an MME/S-GW 302 (see FIG. 3). In the second case, messages and data to be exchanged between the base station 102 (e.g. the eNodeB 102) and the further base station 304 (e.g. the further eNodeB 304) may be routed via the MME/S-GW 302.

In another example, the first UE 104 and the second UE 106 may be controlled by the same base station (e.g. the same eNodeB). In this case messages 612 and 626 may not be required and the corresponding processes that are performed by base station 102 (e.g. the eNodeB 102) or the further base station 304 (e.g. the further eNodeB 304) described above may be performed by the single controlling base station (e.g. the single controlling eNodeB).

This example shows for the sake of simplicity various procedures for a unidirectional communication session from the second UE 106 to the first UE 104 and shows based on this assumption different behaviours for the first UE 104 and the second UE 106. For the case of a bidirectional communication connection, i.e. the first UE 104 may also transmit data simultaneously to the second UE 106, the second UE 106 may take over the role of the first UE 104 in parallel to the role of being the second UE 106, i.e. may perform the same steps as described for the first UE 104. This is also valid for the steps performed by the base stations 102, 304 (e.g. the eNodeBs 102, 304) in this case. It may happen that both UEs 104, 106 simultaneously perform the initiation of a handover or a preparation for a handover as described above. The base stations 102, 304 (e.g. the eNodeBs 102, 304) may detect such duplicated indications and may only consider the earliest indications. To detect such duplicates, a unique D2D session ID may be included in all the messages described above. Furthermore, most communication connections may be bidirectional, e.g. in case the first UE 104 receives user data from the second UE 106, it may transmit periodically acknowledgment message back to the second UE 106 if the reception was correct. Therefore, the second UE 106 may also receive data from the first UE 104 which may be used to determine the link reliability at the second UE 106. This means that the second UE 106 may take the role of the first UE 104 (at least from time to time) and therefore may also perform the processes of the first UE 104 described above and e.g. may also indicate unreliable links and the need for a session transfer to the base station (e.g. the eNodeB).

To summarize, the communication terminal devices (e.g. UEs) may indicate the communication session transfer need to the eNB, once the link reliability falls below a second threshold.

As an alternative, a communication session transfer may be provided also for other reasons than for the reason of a D2D communication connection becoming too unreliable. By way of example, one of the communication terminal devices (e.g. UEs) may require a reliable authentication of the other communication terminal device (e.g. UEs), e.g. for age verification (e.g. one of the communication terminal devices (e.g. UEs) may be part of a cigarette automat or another automat offering products with an age limitation), wherein the authentication or the age verification may be provided by means of a then established wide area radio communication technology communication connection, e.g. using information about a user stored e.g. in a Home Location Register (HLR).

Furthermore, the base station (e.g. the eNodeB) will may start a communication connection setup to all involved UEs upon reception of at least one indication of a communication session transfer need.

The communication session may be continued by using cellular resources.

Various of the above procedures may be advantageous, as they may enable a fast transfer of a direct communication session in case of bad radio conditions with minimal signalling overhead over the radio interface. The indication of a single UE may be sufficient to trigger the communication connection setups of all involved UEs to the base station (e.g. the eNodeB). This may lead to a reliable direct communication experience at the users.

For the case that two or more base stations (e.g. two or more eNodeBs) are currently acting as serving cell for the involved UEs, additional processes may be provided:

After a base station (e.g. an eNodeB) receives an indication of low link reliability and detects that other base stations (e.g. the other eNodeBs) are required to take over the communication session, the base station (e.g. the eNodeB) may request the other base stations (e.g. the other eNodeBs) to prepare for communication session transfer for the UEs they are serving and that are associated to the same D2D communication (this is done in addition to the process in which the base station (e.g. the eNodeB) prepares for the communication session transfer).

After the base station (e.g. the eNodeB) receives an indication of an session transfer need and detects that other base stations (e.g. the other eNodeBs) are required to take over the session, the base station (e.g. the eNodeB) may request the communication connection setup to other UEs belonging to the same D2D communication at the relating serving base stations (e.g. the relating serving eNodeBs) (in addition to the process in which the base station (e.g. the eNodeB) starts the communication connection setup to all involved UEs).

These additional processes may be advantageous, as even in case that multiple base stations (e.g. eNodeBs) are currently serving cells of the involved UEs, the signalling overhead over the radio interface is very low, i.e. the indication of a single UE may be sufficient to trigger the connection setups of all involved UEs towards the relating base stations (e.g. the relating eNodeBs) and the forwarding of data between these base stations (e.g. these eNodeBs).

In various aspects of this disclosure, a radio communication device is provided, which may include: a cellular wide area radio communication technology circuit configured to provide a communication according to a cellular wide area radio communication technology; a circuit configured to provide a direct communication device to communication device communication; and a message generator configured to generate a message indicating a request for a handover from an established direct communication device to communication device communication connection with a second radio communication device to a cellular wide area radio communication connection with the second radio communication device. The circuit may be configured to provide the direct communication device to communication device communication with the second radio communication device according to information received by a radio base station. Furthermore, the circuit may be configured to provide the direct communication device to communication device communication with the second radio communication device according to information received by an eNodeB. Furthermore, the cellular wide area radio communication technology circuit may be configured to provide a communication according to a Third Generation Partnership Project radio communication technology. Moreover, the cellular wide area radio communication technology circuit may be configured to provide a communication according to a Long Term Evolution radio communication technology. The circuit may be configured to provide a direct communication device to communication device communication bypassing a cellular wide area radio communication network. The circuit may be configured to provide the direct communication device to communication device communication under a control of an entity of a cellular wide area radio communication network. Furthermore, the radio communication device may be configured as a radio communication terminal device. The radio communication device may further include a measurement circuit configured to measure a signal quality of signals of the established direct communication device to communication device communication connection with the second radio communication device. The message generator may be configured to generate the message indicating a request for a handover if the signal quality fulfills a predefined quality criterion. The message generator may be configured to generate the message indicating a request for a handover so that the message includes information about resources required for the cellular wide area radio communication connection with the second radio communication device. Furthermore, the message generator may be configured to generate a further message indicating a request for a handover preparation by a radio base station. The radio communication device may further include a measurement circuit configured to measure a signal quality of signals of the established direct communication device to communication device communication connection with the second radio communication device; wherein the message generator is configured to generate the further message indicating a request for a handover preparation if the signal quality fulfills a further predefined quality criterion.

In various aspects of this disclosure, a radio communication device is provided, which may include: a cellular wide area radio communication technology circuit configured to provide a communication according to a cellular wide area radio communication technology; a circuit configured to provide a direct communication device to communication device communication bypassing a cellular wide area radio communication network; a message generator configured to generate a message including information about the quality of a direct communication device to communication device communication connection with a second radio communication device.

The circuit may be configured to provide the direct communication device to communication device communication with the second radio communication device according to information received by a radio base station. The circuit may be configured to provide the direct communication device to communication device communication with the second radio communication device according to information received by an eNodeB. The cellular wide area radio communication technology circuit may be configured to provide a communication according to a Third Generation Partnership Project radio communication technology. The cellular wide area radio communication technology circuit may be configured to provide a communication according to a Long Term Evolution radio communication technology. Furthermore, the circuit may be configured to provide the direct communication device to communication device communication under a control of an entity of a cellular wide area radio communication network. The radio communication device may be configured as a radio communication terminal device. Furthermore, the radio communication device may further include a measurement circuit configured to measure a signal quality of signals of the established direct communication device to communication device communication connection with the second radio communication device; wherein the quality of a direct communication device to communication device communication connection includes information about the signal quality. The message generator may be configured to generate the message if the signal quality fulfills a predefined quality criterion. The message generator may be configured to generate the message to include information about radio resources required for the cellular wide area radio communication connection with the second radio communication device.

In various aspects of this disclosure, a radio communication device is provided, which may include: a cellular wide area radio communication technology circuit configured to provide a communication according to a cellular wide area radio communication technology; a circuit configured to provide a direct communication device to communication device communication bypassing a cellular wide area radio communication radio access network; a message generator configured to generate a message indicating a possible handover from an established direct communication device to communication device communication with a second radio communication device to a cellular wide area radio communication connection with the second radio communication device.

In various aspects of this disclosure, a cellular wide area radio base station is provided, which may include: a receiver configured to receive a message from a first radio communication device, the message being indicating a request for a handover from an established direct communication device to communication device communication connection of the first radio communication device with a second radio communication device to a cellular wide area radio communication connection with the second radio communication device; a cellular wide area radio communication technology circuit configured to provide a communication according to a cellular wide area radio communication technology; and a controller configured to establish a cellular wide area radio communication connection between the first radio communication device and the second radio communication device based on the message.

The controller may further be configured to control the direct communication device to communication device communication connection between the first radio communication device with the second radio communication device. Furthermore, the cellular wide area radio base station may be configured as an eNodeB. The cellular wide area radio communication technology circuit may be configured to provide a communication according to a Third Generation Partnership Project radio communication technology. The cellular wide area radio communication technology circuit may be configured to provide a communication according to a Long Term Evolution radio communication technology. Furthermore, the direct communication device to communication device communication may bypass the cellular wide area radio base station. The receiver may be configured to receive a further message indicating a request for a handover preparation by the radio base station; wherein the controller may further be configured to allocate radio resources in preparation for the cellular wide area radio communication connection between the first radio communication device and the second radio communication device.

As illustrated above, the users may continue an established D2D communication session or connection that was initiated as direct communication even when a direct communication (D2D communication) is no more possible. Thus, it may now be possible maintain a communication connection initiated as D2D communication connection while the UEs are departing and therefore the link of the direct (D2D) connection is lost.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A user equipment (UE), comprising:
a cellular wide area radio communication technology circuit configured to provide a communication according to a cellular wide area radio communication technology;
an interface circuit to provide direct device-to-device (D2D) communications between the UE and another UE; and
a message generator configured to generate a first message indicating a request for a handover preparation by a radio base station if a signal quality associated with the direct D2D communication falls below a first threshold;
wherein the message generator is further configured to generate a second message indicating a request for a handover from an established D2D communication connection with a second UE to a cellular wide area radio communication connection with the second UE if a signal quality associated with the direct D2D communication falls below a second threshold;
wherein the UE maintains an active radio resource control (RRC) connection with the radio base station during the direct D2D communication with the second UE.

2. The user equipment of claim 1,
wherein the interface circuit is configured to provide the D2D communication with the second UE according to information received from a base station.

3. The user equipment of claim 2,
wherein the interface circuit is configured to provide the D2D communication with the second UE according to information received by an eNodeB.

4. The user equipment of claim 1,
wherein the cellular wide area radio communication technology circuit is configured to provide a communication according to a Third Generation Partnership Project radio communication technology.

5. The user equipment of claim 1,
wherein the interface circuit is configured to provide the D2D communication under a control of an entity of a cellular wide area radio communication network.

6. The user equipment of claim 1,
configured as a radio communication terminal device.

7. The user equipment of claim 1, further comprising:
a measurement circuit configured to measure the signal quality of signals of the established direct D2D communication connection with the second UE.

8. The user equipment of claim 1,
wherein the message generator is configured to generate the second message indicating a request for a handover and to include information about resources required for the cellular wide area radio communication connection with the second UE in the message.

9. A user equipment (UE), comprising:
a cellular wide area radio communication technology circuit configured to provide a communication according to a cellular wide area radio communication technology;
an interface-circuit configured to provide a direct device-to-device (D2D) communications between the UE and another UE bypassing a cellular wide area radio communication network;
a measurement circuit configured to measure a signal quality of signals of the established direct D2D communication connection with the second UE; and
a message generator configured to generate a message indicating a request for a handover from an established direct D2D communication connection with a second UE to a cellular wide area radio communication connection with the second UE if the signal quality fulfills a predefined quality criterion.

10. The user equipment of claim 9, wherein the interface circuit is configured to provide the direct D2D communication with the second UE according to information received from a base station.

11. The user equipment of claim 9, configured as a radio communication terminal device.

12. The user equipment of claim 9, wherein the quality of a direct communication device to communication device communication connection comprises information about the signal quality.

13. A cellular wide area radio base station, comprising:
a receiver configured to receive a message from a first user equipment (UE), the message indicating a request for a handover from an established direct device-to-device (D2D) communication connection of the first UE with a second UE to a cellular wide area radio communication connection with the second UE
a cellular wide area radio communication technology circuit configured to provide a communication according to a cellular wide area radio communication technology;
a controller configured to establish a cellular wide area radio communication connection between the first UE and the second UE based on the message,
wherein the receiver is configured to receive a further message from the first UE, the message indicating a request for a handover preparation by the radio base station; and
wherein the controller is further configured to allocate radio resources in preparation for the cellular wide area radio communication connection between the first UE and the second UE prior to receiving the request for handover.

14. The cellular wide area radio base station of claim 13, wherein the controller is further configured to control the direct communication device to communication device communication connection between the first radio communication device with the second radio communication device.

15. The cellular wide area radio base station of claim 13, wherein the cellular wide area radio base station is configured as an eNodeB.

16. The cellular wide area radio base station of claim 13, wherein the cellular wide area radio communication technology circuit is configured to provide a communication according to a Third Generation Partnership Project radio communication technology.

* * * * *

UNITED STATES PATENT AND TRADEMARK OFFICE
CERTIFICATE OF CORRECTION

PATENT NO. : 8,855,645 B2
APPLICATION NO. : 13/779884
DATED : October 7, 2014
INVENTOR(S) : Maik Bienas et al.

It is certified that error appears in the above-identified patent and that said Letters Patent is hereby corrected as shown below:

In the claims

Column 16, line 57 (Claim 9): Delete "a" after the word "provide"; and

Column 17, line 19 (Claim 13): Replace "second UE" with --second UE;--.

Signed and Sealed this
Twenty-second Day of March, 2016

Michelle K. Lee
*Director of the United States Patent and Trademark Office*